US006847129B2

(12) United States Patent
McKelvey et al.

(10) Patent No.: US 6,847,129 B2
(45) Date of Patent: Jan. 25, 2005

(54) TURBINE GENERATOR STARTING METHOD AND TURBINE GENERATION SYSTEM

(75) Inventors: Terence McKelvey, Chiba (JP); Tai Furuya, Kanagawa (JP)

(73) Assignee: Ebara Corporation, Tokyo (JP)

(*) Notice: Subject to any disclaimer, the term of this patent is extended or adjusted under 35 U.S.C. 154(b) by 123 days.

(21) Appl. No.: 10/380,468

(22) PCT Filed: Dec. 6, 2002

(86) PCT No.: PCT/JP02/12825

§ 371 (c)(1),
(2), (4) Date: Mar. 20, 2003

(87) PCT Pub. No.: WO03/052922

PCT Pub. Date: Jun. 26, 2003

(65) Prior Publication Data

US 2004/0080164 A1 Apr. 29, 2004

(30) Foreign Application Priority Data

Dec. 7, 2001 (JP) ........................... 2001-402531

(51) Int. Cl.⁷ .................. F01D 15/10; H02M 7/68; F02C 6/00; H02K 7/18; H02P 9/04
(52) U.S. Cl. ........................ 290/52; 363/95
(58) Field of Search ............... 290/52, 1 A, 46; 322/36; 417/319, 53; 363/96, 95; 318/140, 145, 147

(56) References Cited

U.S. PATENT DOCUMENTS

| | | | | |
|---|---|---|---|---|
| 4,451,112 A | * | 5/1984 | Hattori et al. | ............... 318/778 |
| 4,465,961 A | * | 8/1984 | Landino | ..................... 318/811 |
| 4,994,956 A | * | 2/1991 | Kirchberg et al. | ............ 363/95 |
| 5,036,267 A | * | 7/1991 | Markunas et al. | ............ 322/10 |
| 5,559,689 A | * | 9/1996 | Kirchberg et al. | ............ 363/95 |
| 6,023,135 A | * | 2/2000 | Gilbreth et al. | ............. 318/140 |
| 6,055,163 A | * | 4/2000 | Wagner et al. | ................ 363/37 |
| 6,175,217 B1 | * | 1/2001 | Da Ponte et al. | ............. 322/19 |
| 6,380,719 B2 | * | 4/2002 | Underwood et al. | .......... 322/36 |
| 6,381,955 B1 | * | 5/2002 | Morganti et al. | ............. 60/300 |
| 6,489,692 B1 | * | 12/2002 | Gilbreth et al. | ............... 290/52 |
| 6,605,928 B2 | * | 8/2003 | Gupta et al. | .................. 322/10 |
| 6,751,109 B2 | * | 6/2004 | Doss et al. | ................. 363/142 |

FOREIGN PATENT DOCUMENTS

| | | |
|---|---|---|
| JP | 6-14600 | 1/1994 |
| JP | 6-38577 | 2/1994 |
| JP | 10-153102 | 6/1998 |
| JP | 2001-254635 | 9/2001 |
| WO | WO 03/060304 A1 * | 7/2004 |

* cited by examiner

Primary Examiner—Nicholas Ponomarenko
Assistant Examiner—Julio C. Gonzalez
(74) Attorney, Agent, or Firm—Westerman, Hattori, Daniels & Adrian, LLP

(57) ABSTRACT

An object of the present invention is to provide a turbine generation system in which a starting inverter circuit for starting a turbine generator is additionally employed so that the system comprises a high-power generation inverter and the starting inverter with low-power, thereby utilizing the inverter for multiple purposes. To this end, the present invention comprises an inverter control circuit for deactivating a pulse-width modulation inverter for generation connected to a turbine generator, and first switching means for connecting an internal power supply to the turbine generator, wherein the inverter control circuit controls the starting inverter to supply the turbine generator with power to drive it up to a purge speed and accelerate it to a predetermined starting speed.

9 Claims, 5 Drawing Sheets

TURBINE GENERATOR STARTING METHOD AND TURBINE GENERATION SYSTEM

TECHNICAL FIELD

The present invention relates to a method of starting a turbine generator and a turbine generation system, and more particularly, to a method of starting a turbine generator and a turbine generation system based on inverter control using a pulse width modulation scheme.

BACKGROUND ART

Conventionally, there have been known a method and apparatus for starting a turbine generator with an inverter which controlled by a microprocessor, in which a motor installed on a shaft of a gas turbine is driven by an external power supply through the inverter, and AC power generated from the turbine generator is supplied through the inverter to power lines of the external power source after the time the started gas turbine switches to an autonomous working operation.

Another known gas turbine starting apparatus can start a gas turbine, in a simple mechanism as compared with an inverter, using an AC power supply without any change made to a DC motor installed in the gas turbine (for example, see Japanese Patent Public Disclosure (Kokai) No. 2001-254635 (particularly, Paragraph [0011] and FIG. 1).

However, since a gas turbine is generally rotated at high operation speeds, a high voltage-resistant rectifier circuit is required for converting AC power generated from a turbine generator to DC power, and a large scaled circuit is also required for an inverter to tolerate high frequencies.

On the other hand, some devices incorporated in a power generation system should be controlled at variable speeds, so that a general-purpose inverter is also needed. However, such an inverter is limited in its utilization.

DISCLOSURE OF THE INVENTION

The present invention has been made in view of the problems in prior arts as mentioned above, and an object of the present invention is to provide a turbine generation system which comprises separate inverters for generation and for starting and in which the inverters are utilized for multiple purposes, in particular the starting inverter is also utilized as a general-purpose inverter. It should be noted that the present invention has been accomplished from the viewpoint that a turbine generator can be started sufficiently with power generated by a relatively low-voltage and low-frequency inverter, thus permitting the utilization of a low-power general-purpose inverter as a starting inverter.

To achieve the above object, in a first aspect, the present invention provides a method of starting a turbine generator using an internal power supply, which comprises the steps of deactivating a pulse-width-modulation inverter for generation connected to the turbine generator; supplying DC power to a pulse-width-modulation inverter for starting from the internal power supply through a DC matching circuit; closing first switching means to connect the starting inverter to the turbine generator; driving the turbine generator up to a purge speed (speed at which unnecessary gases within the turbine are purged) and supplying power from the starting inverter to the turbine generator for acceleration up to a predetermined starting speed (speed equal to or higher than an autonomous operation of the turbine); driving gates of the starting inverter by a pulse-width-modulated signal (output of the driver) received from an inverter control circuit; deactivating the starting inverter (OFF state) when the speed of the turbine generator reaches the predetermined starting speed, and opening the first switching means, to isolate the starting inverter from the turbine generator; and activating the generation inverter.

In the configuration as described above, the turbine generator can be started with power supplied from the internal power supply such as a battery or a storage cell, and the DC matching circuit which is used during the normal power generation by the turbine generator, can also be used for starting operation. Moreover, no rectifier is required during the starting operation.

To achieve the above object, in a second aspect, the present invention provides a method of starting a turbine generator using an external commercial power supply, which comprises the steps of deactivating a pulse-width-modulation inverter for generation connected to the turbine generator; closing second switching means to connect the commercial power supply to a rectifier for starting, and closing third switching means to connect the rectified power from the commercial power supply to a DC bus; supplying a pulse-width-modulation inverter for starting with the rectified power from the commercial power supply through a DC matching circuit; closing first switching means to connect the starting inverter to the turbine generator; driving the turbine generator up to a purge speed (speed at which unnecessary gases are emitted) and supplying power from the starting inverter to the turbine generator for acceleration up to a predetermined starting speed (a speed equal to or higher than the turbine autonomous operation); driving gates of the starting inverter by a pulse-width-modulated signal (output of the driver) received from an inverter control circuit; deactivating the starting inverter (OFF state) when the speed of the turbine generator reaches the predetermined starting speed, opening the first switching means to isolate the starting inverter from the turbine generator, opening the third switching means to isolate the rectified power from the commercial power supply from the DC bus and opening the second switching means to disconnect the starting rectifier from the commercial power supply; and activating the generation inverter (ON state).

In the configuration as described above, the turbine generator can be started by supplying the external commercial power supply, for example, AC 100V/200V power at 50/60 Hz to the starting means, and the DC matching circuit which is used during the normal power generation by the turbine generator, can also be used for starting operation.

To achieve the above object, in a third aspect, the present invention provides a turbine generation system for starting a turbine generator using an internal power supply, which comprises a pulse-width-modulation inverter for starting supplied with DC power from the internal power supply through a DC matching circuit; first switching means for connecting the starting inverter to the turbine generator; and an inverter control circuit for controlling to deactivate an inverter for generation connected to the turbine generator, drive the turbine generator up to a purge speed (speed at which unnecessary gases are exhausted), supply the turbine generator with power from the starting inverter for acceleration up to a predetermined starting speed (speed equal to or higher than the turbine autonomous operation), deactivate the starting inverter (OFF state) when the speed of the turbine generator reaches the predetermined starting speed (speed equal to or higher than an autonomous operation of the turbine), and open the first switching means to isolate the starting inverter from the turbine generator, and activate the generation inverter.

In the configuration as described above, the turbine generator can be started with power from the internal power supply such as a battery or a storage cell, and the DC matching circuit which is used during the normal power generation by the turbine generator, can also be used for starting operation. Moreover, no rectifier is required during the starting operation.

To achieve the above object, in a fourth aspect, the present invention provides a turbine generation system for starting a turbine generator from an external commercial power supply, which comprises second switching means for connecting the commercial power supply to a rectifier for starting; third switching means for connecting the rectified power from the commercial power supply to a DC bus; fourth switching means for supplying the rectified power from the commercial power supply to a pulse-width-modulation inverter for starting through a DC matching circuit; first switching means for connecting the starting inverter to the turbine generator; and an inverter control circuit for controlling to deactivate a pulse-width-modulation inverter for generation connected to the turbine generator (OFF state), drive the turbine generator up to a purge speed, supply the turbine generator with power from the starting inverter for acceleration up to a predetermined starting speed, deactivate the starting inverter (OFF state) when the speed of the turbine generator reaches the predetermined starting speed, open the first switching means to isolate the starting inverter from the turbine generator, open the third switching means to isolate the rectified power from the commercial power supply from the DC bus, open the second switching means to disconnect the starting rectifier from the commercial power supply, and activate the generation inverter.

In the configuration as described above, the turbine generator can be started by supplying the starting means with the external commercial power supply, for example, AC 100V/200V power at 50/60 Hz, and the DC matching circuit which is used during the normal power generation by the turbine generator, can also be used during the starting operation.

To achieve the above object, in a fifth aspect, the present invention provides a turbine generation system for supplying AC power, having a turbine generator, a rectifier, a DC matching circuit and a pulse-width-modulation inverter for generation connected in series, which comprises a pulse-width-modulation inverter for starting connected to an output of the DC matching circuit; first switching means for connecting the starting inverter to the turbine generator; second switching means for connecting the generation inverter to a commercial power supply; third switching means for connecting the commercial power supply to an input of the rectifier through the second switching means; and an inverter control circuit for controlling to drive the turbine generator up to a purge speed while maintaining the generation inverter deactivated, supply the turbine generator with AC power from the starting inverter for acceleration up to a predetermined starting speed, open the first switching means to disconnect the output of the starting inverter from the turbine generator when the speed of the turbine generator reaches the predetermined starting speed, open the third switching means to disconnect the commercial power supply from the rectifier, and activate the generation inverter to link the turbine generation system to the commercial power supply.

In the configuration as described above, since the rectifier can be shared for starting and for generation, the system can be of a simple configuration.

In the turbine generation systems according to the present invention in the third to fifth aspects, the inverter control circuit preferably switches the first switching means (when it is in disconnection state to the turbine generator) to connect the output of the starting inverter to a pump driven motor to drive a circulating pump of a boiler for recovering waste heat of the turbine generator therethrough.

In the configuration as described above, the first switching means is switched to connect the output of the starting inverter to the pump driven motor after the speed of the turbine generator reaches the predetermined starting speed, thereby making it possible to drive the circulating pump of the boiler for recovering waste heat of the turbine generator.

To achieve the above object, in a sixth aspect, the present invention provides a turbine generation system for supplying AC power, having a turbine generator, a rectifier, a DC matching circuit and a pulse-width-modulation inverter for generation connected in series, which comprises a pulse-width-modulation inverter for starting connected to an output of the DC matching circuit; first switching means disposed between the starting inverter and first stator windings of the turbine generator; second switching means disposed between the generation inverter and the commercial power supply; third switching means disposed between an input of the rectifier and the commercial power supply; fifth switching means disposed between an output of the generation inverter and second stator windings of the turbine generator; fourth switching means disposed between the rectifier and the first and second stator windings of the turbine generator; and an inverter control circuit for controlling to close the first switching means, the third switching means and the fifth switching means, activate the starting inverter and the generation inverter, drive the turbine generator up to a purge speed, supply the first and second stator windings of the turbine generator with AC power from the starting inverter and the generation inverter, respectively, for acceleration up to a predetermined starting speed, open the first switching means, the third switching means and the fifth switching means to disconnect the outputs of the starting inverter and the generation inverter from the first and second stator windings of the turbine generator, respectively, when the speed of the turbine generator reaches the predetermined starting speed, and close the second switching means and the fourth switching means to link the turbine generation system to the commercial power supply.

In the configuration as described above, since the turbine generator is started by supplying the first and second stator windings with the AC power from the starting and generation inverters, respectively, the starting time can be reduced by torques of the two sets of stator windings.

In the turbine generation system according to the present invention in the sixth aspect, the inverter control circuit is preferably constituted such that it closes the first switching means to supply the first stator windings with AC power for applying a reverse torque to a rotor at the time a linkage to the commercial power supply is released, and subsequently opens the second switching means.

In this configuration, it is possible to avoid the turbine from reaching an excessive speed due to a no load condition which occurs when the linkage to the commercial power supply is released.

Also, in turbine generation system according to the present invention in the sixth aspect, the inverter control circuit is preferably constituted such that it switches the first switching means (when it is in disconnection state to the turbine generator) to connect the output of the starting inverter to a pump driven motor to drive a circulating pump of a boiler for recovering waste heat of the turbine generator therethrough.

In this configuration, the first switching means is switched to connect the output of the starting inverter to the pump driven motor, after the turbine generator reaches the predetermined starting speed, thereby making it possible to drive the circulating pump of the boiler for recovering waste heat of the turbine generator therethrough.

BEST MODE FOR CARRYING OUT THE INVENTION

Figure 1:
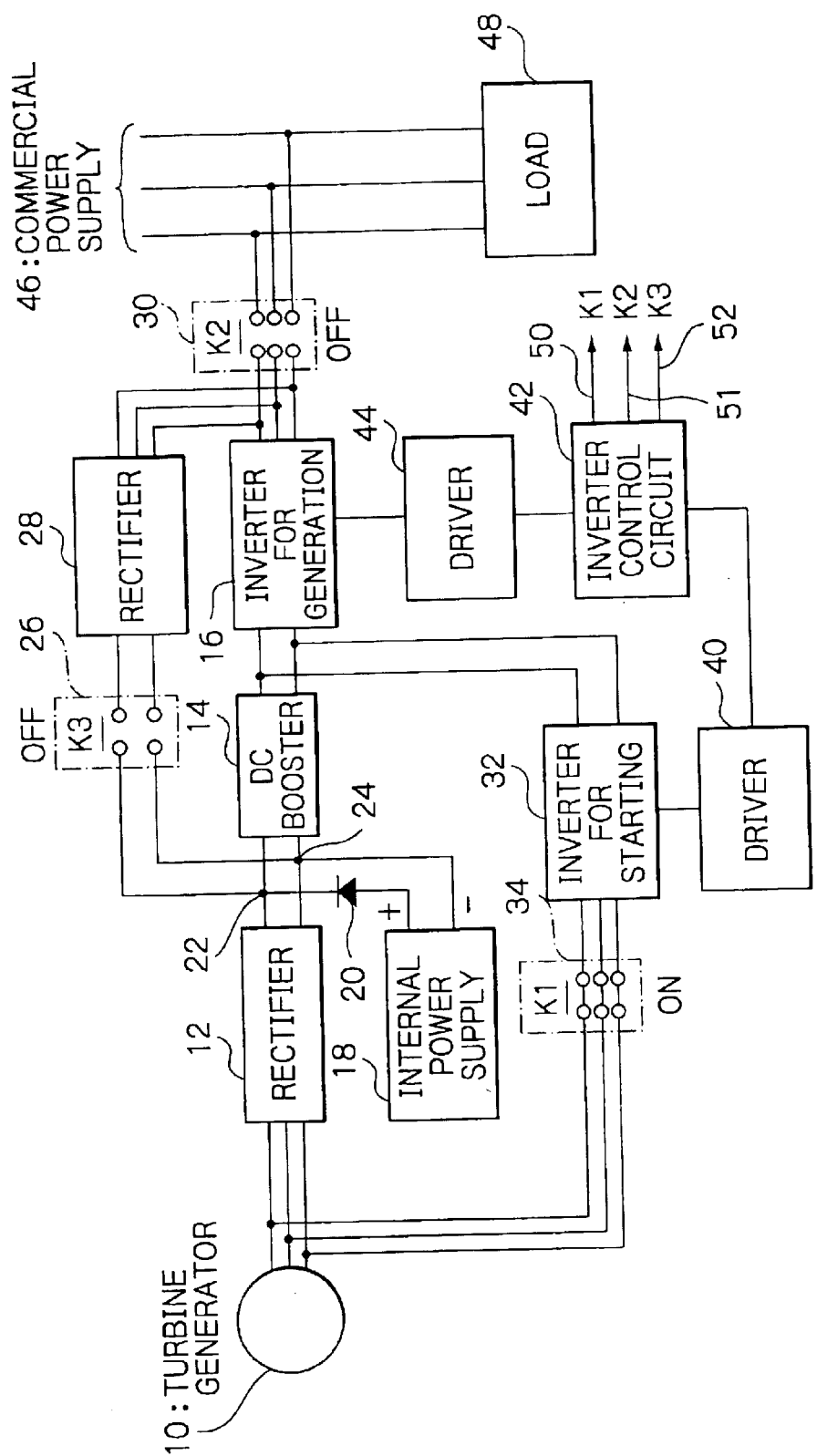
FIG. 1 is a schematic block diagram illustrating a turbine generation system of a first embodiment according to the present invention.

In the following, embodiments of the present invention will be described with reference to the drawings. FIGS. 1 to 5 illustrate first to fourth embodiments of the present invention, wherein parts designated by the same or similar reference numerals represent identical or corresponding ones, and repeated description thereon will be omitted.

FIG. 1 is a schematic block diagram of a turbine generation system illustrating a first embodiment of the present invention. The turbine generation system comprises a turbine generator 10 which is composed of a turbo generator or gas turbine; a rectifier 12 for generation connected to the turbine generator 10; a DC booster 14 as a DC matching circuit connected to the output of the generation rectifier 12; a pulse-width-modulation inverter for generation (main inverter) 16 connected to the output of the DC booster 14; an internal power supply 18 such as a battery and/or a DC storage cell connected to DC buses routed between the generation rectifier 12 and DC booster 14; a pulse-width-modulation inverter 32 for starting connected to the output of the DC booster 14; a driver 40 for driving the starting inverter 32; a driver 44 for driving the generation inverter 16; a first switching means (K1) 34 for activating/deactivating the starting and generation inverters 32 and 16 through the drivers 40 and 44 and for connecting/disconnecting the starting inverter 32 to/from the turbine generator 10; a second switching means (K2) 30 for connecting/disconnecting a commercial power supply 46 to/from the generation inverter 16; a third switching means (K3) 26 for connecting/disconnecting the starting rectifier 28 to/from DC buses 22 and 24; and an inverter control circuit 42 for controlling these switching means to open and close. The generation inverter 16 and starting inverter 32 are preferably formed of a plurality of IGBT transistors having gates.

An operation of the turbine generation system will be described with reference to the block diagram of FIG. 1.

First, the inverter control circuit 42 disables the driver 44 to deactivate the pulse-width-modulation generation inverter connected to the turbine generator 10, and transmits an inactive K2 control signal 51 to the second switching means 30 for controlling the same to open. In other words, the generation inverter 16 is disconnected from the commercial power supply 46 by the opened second switching means, so that a power network link is in an open state.

In this open state, the inverter control circuit 42 transmits an active K1 control signal 50 to the first switching means 34 for controlling the same to close. The pulse-width-modulation starting inverter 32 is connected to the turbine generator 10 through the closed first switch means 34 to supply the starting inverter 32 with DC power from the internal power supply 18 through the DC booster 14. A blocking diode 20 connected between the DC bus 22 and the internal power supply 18 is a means for preventing overcharging when electric energy generated by the turbine generator 10 is converted to DC power for charging.

Next, the inverter control circuit 42 transmits a pulse signal to the driver 40 to supply the turbine generator 10 with sinusoidal AC power from the starting inverter 32 for driving the turbine generator 10 from a stop state to a purge speed (speed at which unnecessary gases are emitted), and accelerating the turbine generator 10 to a speed equal to or higher than a predetermined starting speed at which a turbine autonomous operation can be done.

Subsequently, the inverter control circuit 42 disables the driver 40 to deactivate the starting inverter 32, i.e., bringing the same into an OFF state after the speed of the turbine generator 10 has reached the predetermined starting speed or the turbine autonomous operation speed, and transmits an inactive K1 control signal 50 to the first switching means 34 for controlling the same to open, thereby isolating the turbine generator 10 from the starting inverter 32 under the control of the inverter control circuit 42.

Thus, in this embodiment, the turbine generator 10 is supplied with the power from the internal power supply such as a battery or storage cell to start the gas turbine, and the DC booster 14 which is used during a normal power generation by the turbine generator 10, can be used as well for starting. Moreover, the rectifier 28 for rectifying the commercial power supply 46, is not required during the starting operation.

Figure 2:
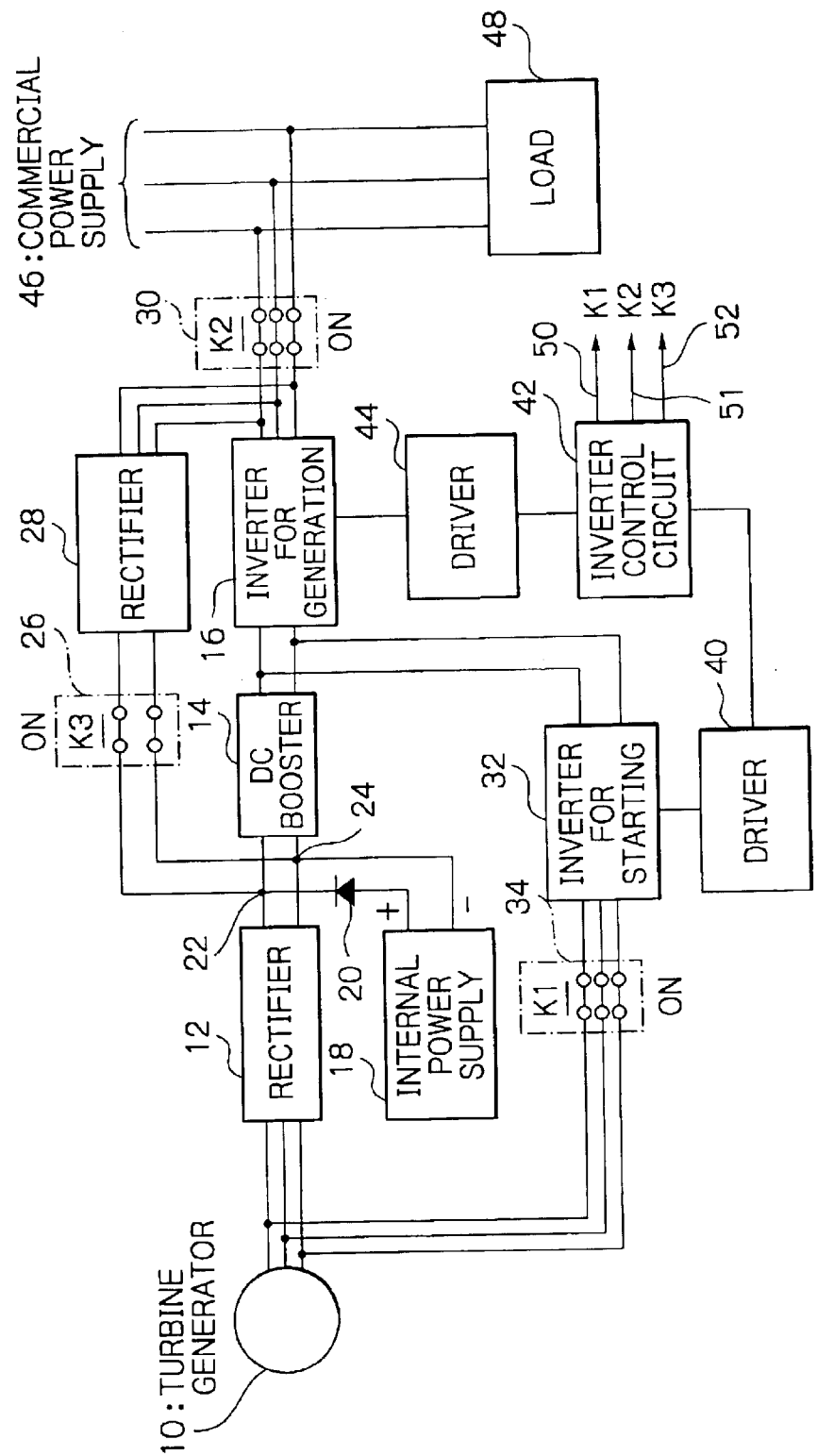
FIG. 2 is a schematic block diagram illustrating a turbine generation system of a second embodiment according to the present invention.

FIG. 2 is a schematic block diagram of a turbine generation system illustrating a second embodiment of the present invention. Equivalent members to the generation rectifier 12, DC booster 14, generation inverter 16, internal power supply 18, starting rectifier 28, starting inverter 32, driver 40, driver 44, and inverter control circuit 42 in the foregoing embodiment can be used in the second embodied turbine generation system, so that repeated description thereon is omitted.

The inverter control circuit 42 disables the driver 44 to deactivate the pulse-width-modulation generation inverter 16 (OFF state) connected to the turbine generator 10.

The inverter control circuit 42 also transmits an active K2 control signal 51 to the second switching means 30 to render the second switching means 30 closed. Through the second switching means 30, the commercial power supply 46 of 100/200 volts at 50/60 Hz, for example, is connected to the starting rectifier 28. The inverter control circuit 42 transmits an active K3 control signal 52 to the third switching means 26 to render the third switching means 26 closed (ON). Through the third switching means, the starting rectifier 28 is connected to the DC buses 22, 24 to supply the pulse-width-modulation starting inverter 32 with DC power, which is generated by rectifying power from the commercial power supply 46, from the DC buses 22, 24 through the DC booster 14.

The inverter control circuit 42 further transmits an active K1 control signal 50 to the first switching means 34 to render the first switching means 34 closed (ON). Through this first switching means 34, the pulse-width-modulation starting inverter 32 is connected to the turbine generator 10. The inverter control circuit 42 transmits a pulse signal to the driver 40 to drive the turbine generator 10 up to the purge speed, and force the starting inverter 32 to supply the turbine generator 10 with AC power for acceleration to a predetermined starting speed. Then, the inverter control circuit 42 disables the driver 40 to deactivate the starting inverter 32, i.e., bringing the same into an OFF state after the speed of the turbine generator 10 has reached the predetermined starting speed.

Subsequently, the inverter control circuit 42 transmits an inactive K1 control signal 50 to the first switching means 34 to render the first switching means 34 opened (see FIG. 3). By opening the first switching means 34 (OFF), the starting inverter 32 is isolated from the turbine generator 10.

The inverter control circuit 42 also transmits an inactive K3 signal 52 to the third switching means 26 to render the third switching means 26 opened (OFF), resulting in that the DC power, which is obtained by rectifying power from the commercial power supply 46, is isolated from the DC buses 22, 24.

Simultaneously, the inverter control circuit 42 transmits an inactive K2 control signal 51 to the second switching means 30 to render the second switching means 30 opened, thereby disconnecting the starting rectifier 28 from the commercial power supply 46, and then enables the driver 44 so that the pulse-width-modulation generation inverter 16 is activated. In other words, the generation inverter 16 can supply sinusoidal AC power in response to a driving signal from the driver 44 which is created based on the pulse signal transmitted from the inverter control circuit 42.

According to this embodiment, the turbine generator 10 can rectify the external commercial power supply, for example, AC 100 V/200 V power at 50/60 Hz, and supplies the DC booster 14 with the rectified power to start the turbine. The DC booster 14 which is used during the normal power generation by the turbine generator 10, can be utilized as well during the starting operation.

Figure 3:
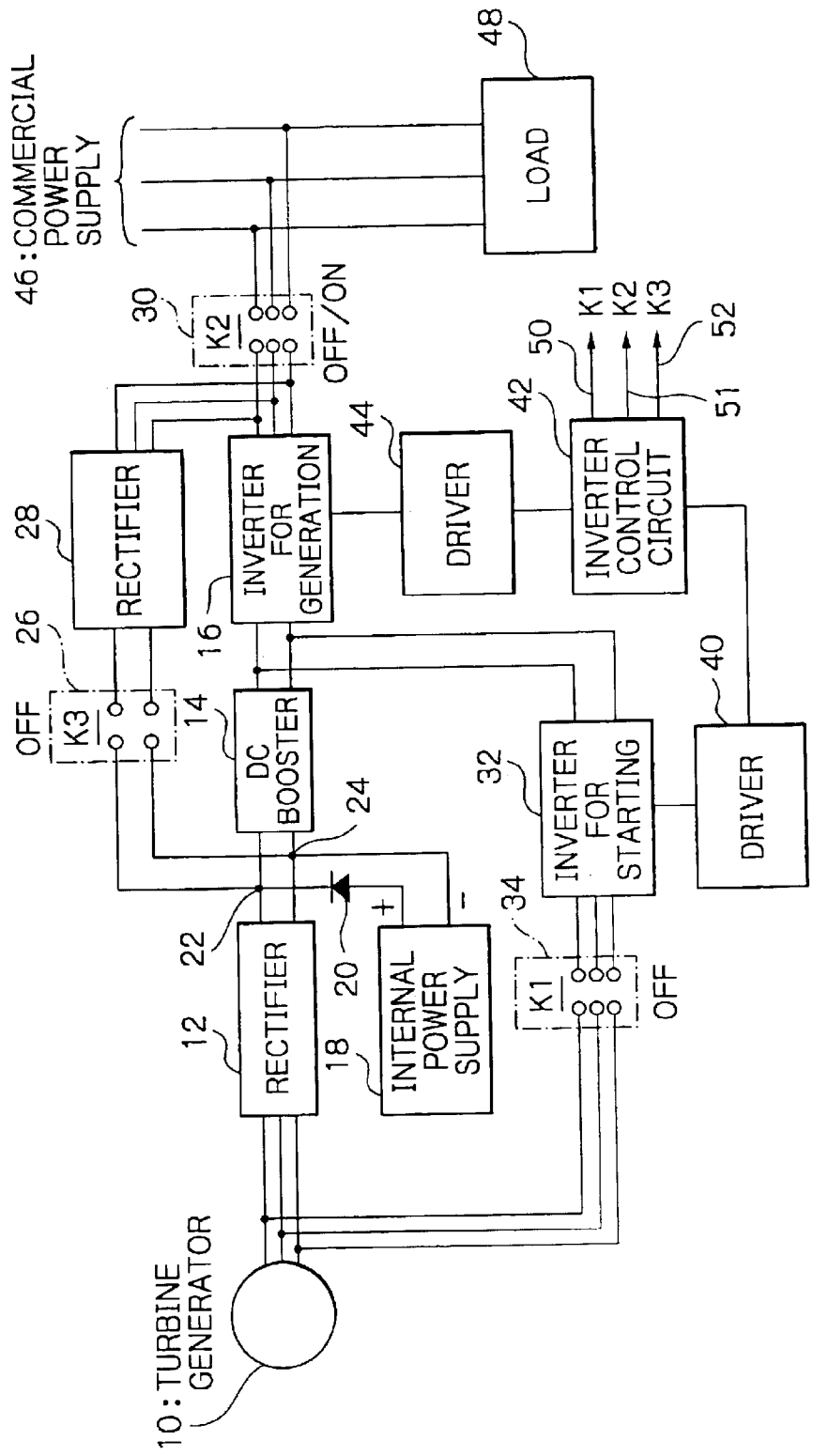
FIG. 3 is a schematic block diagram of a turbine generation system illustrating a combination of the first and second embodiments according to the present invention.

FIG. 3 is a schematic block diagram of a turbine generation system illustrating a combination of the first and second embodiments of the present invention. Equivalent members to the generation rectifier 12, DC booster 14, generation inverter 16, internal power supply 18, starting rectifier 28, starting inverter 32, driver 40, driver 44, and inverter control circuit 42 in the foregoing embodiments can be used in the turbine generation system shown in FIG. 3, so that repeated description thereon is omitted.

The inverter control circuit 42 disables the driver 40 to deactivate the starting inverter 32, i.e., bring the same into an OFF state when the speed of the turbine generator 10 has reached a predetermined starting speed.

The inverter 42 also transmits an inactive K1 control signal 50 to render the first switching means 34 opened (OFF), for isolating the starting inverter 32 from the turbine generator 10.

Likewise, the inverter control circuit 42 transmits an inactive K3 control signal 52 to render the third switching means 26 opened (OFF), for isolating a DC power which is obtained by rectifying power from the commercial power supply 46, from the DC buses 22 and 24.

Likewise, the inverter control circuit 42 transmits an inactive K2 control signal 51 to render the second switching means 30 opened (OFF), for disconnecting the starting rectifier 28 from the commercial power supply 46, and enables the driver 44 to activate the pulse-width-modulation generation inverter 16.

Subsequently, the inverter control circuit 42 detects a voltage, frequency and phase of the AC power output from the pulse-width-modulation generation inverter 16 and determines whether they match the voltage, frequency and phase of the commercial power supply 46. The circuit 42 then transmits an active K2 control signal 51 for bringing the second switching means 30 into a closed (ON) state if the AC power from the inverter 16 matches the commercial power supply 46, so that the output of the pulse-width-modulation generation inverter 16 can be linked to the lines of the commercial power supply 46.

Since a load 48 connected to the commercial power supply 46 can be supplied with the AC power from the generation inverter 16, the amount of applied commercial power supply 46 can be reduced.

Thus, in this embodiment, the inverter control circuit 42 can drive the gates of IGBT transistors in the starting inverter 32 through the driver 40, drive the gates of IGBT transistors in the pulse-width-modulation generation inverter 16 through the driver 44, and transmit the K1 control signal 50, K2 control signal 51 and K3 control signal 52 to the switching means 26, switching means 30 and switching means 34, respectively, thereby ON/OFF-switching these switching means.

According to this embodiment, the turbine generation system supplies the load 48 connected to the external commercial power supply 46 with the power generated from the turbine generator 10 through the generation inverter 16. For example, the turbine generation system can supply AC 100V/200V power at 50/60 Hz, and can utilize the DC booster 14 which is used during the normal generation operation by the turbine generator 10 as well when the turbine generator 10 is in the starting operation.

Figure 4:
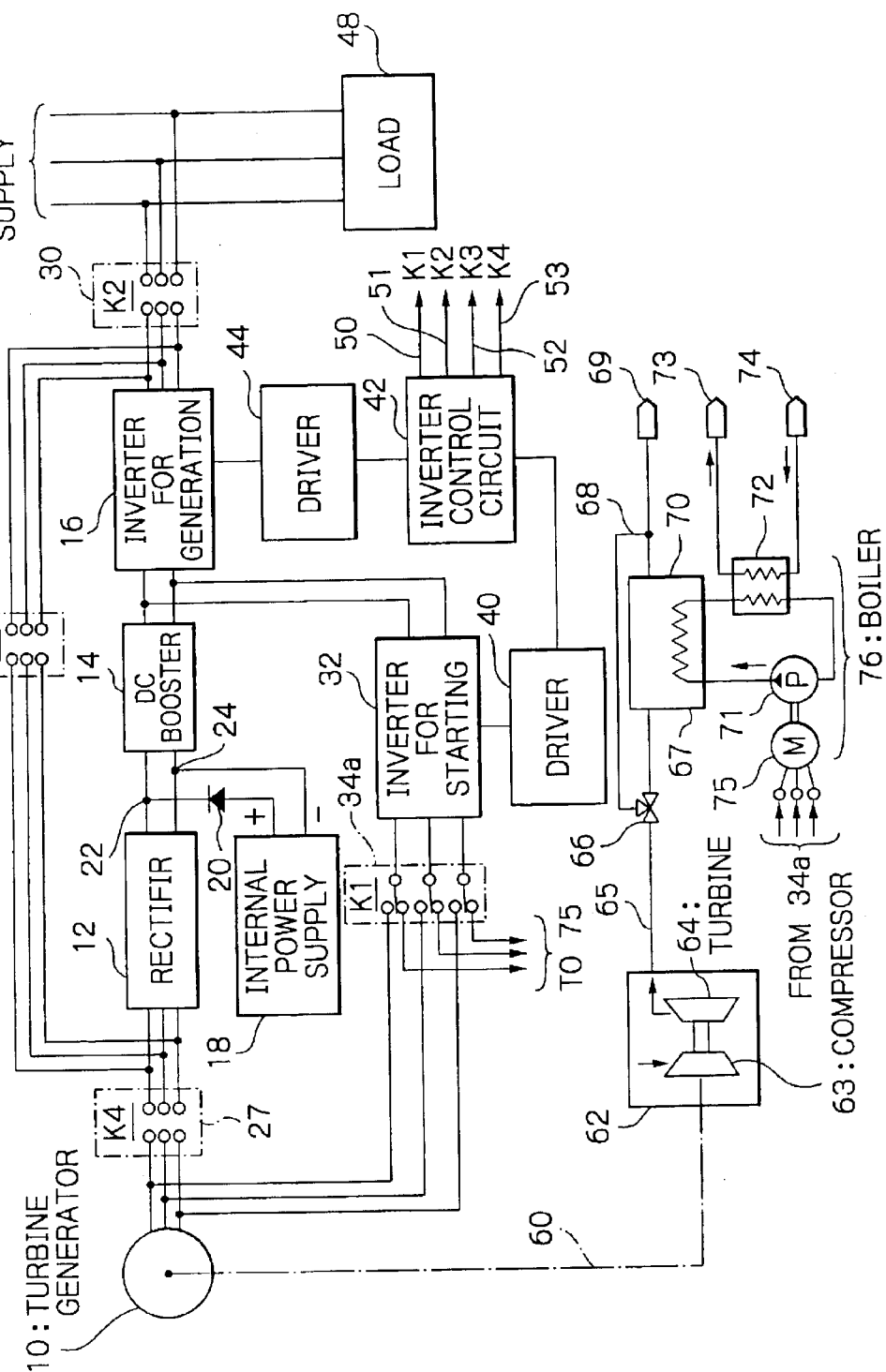
FIG. 4 is a schematic block diagram of a turbine generation system illustrating a third embodiment according to the present invention.

FIG. 4 is a schematic block diagram of a turbine generation system illustrating a third embodiment of the present invention. The turbine generation system comprises a turbine generator 10; a rectifier 12 for use in both starting and power generation operation; a DC booster 14 connected to the output of the rectifier 12; a pulse-width-modulation generation inverter 16 connected to the output of the DC booster 14; an internal power supply 18 connected to DC buses 22, 24 routed between the generation rectifier 12 and DC booster; pulse-width-modulation starting inverter 32 connected to the output of the DC booster 14; a driver 40 for driving the starting inverter 32; a driver 44 for driving the generation inverter 16; and an inverter control circuit 42 for controlling, i.e., opening and closing a first switching means (K1) 34a for activating or deactivating the starting and generation inverters through the driver 40 and driver 44 and for connecting/disconnecting the starting inverter 32 to/from the turbine generator 10 or switching to a pump driven motor 75, a second switching means (K2) 30 for connecting/disconnecting a commercial power supply 46 to/from the generation inverter 16, a third switching means (K3) 26 for connecting/disconnecting the commercial power supply 46 when the second switching means 30 is closed, to/from the input of the rectifier 12, and a fourth switching means (K4) for connecting/disconnecting the turbine generator 10 to/from the rectifier 12, respectively.

The turbine generator 10 includes stator windings wound around a permanent magnet secured to a rotor, and a turbine rotor coaxial to the rotor on an extension of a one-dot chain line 60 shown in the drawing. A compressor 63 and a turbine 64 are commonly connected to the turbine rotor to construct a gas turbine device 62. The gas turbine device 62 compresses, for example, air taken from the outside with the compressor 63 and feeds the compressed air to a combustion chamber (not shown) which is supplied with a fuel to generate a combustion gas.

The combustion gas, which is led by the turbine 64, expands and rotates the turbine 64 at a speed of approximately 60,000 rpm. The expanded exhaust gas is introduced into a boiler 76 through an exhaust gas pipe 65 and a valve 66. A bypass pipe 68 is branched off the valve 66, such that the valve 66 can be opened or closed to control the amount of exhaust gas introduced into and passing through the boiler 76. In this embodiment, the exhaust gas can be used for a co-generation system.

The boiler 76 comprises an exhaust heat recovery heat exchanger 67 connected to the exhaust gas pipe 65; an exhaust gas passage 69 into which a downstream end of the bypass pipe 68 and an exhaust pipe of the exhaust heat recovery heat exchanger 67 join; a hot water heat exchanger 72; a circulation path 70 which circulates through the exhaust heat recovery heat exchanger 67 and the hot water heat exchanger 72; a circulating pump 71 for circulating a heat exchanging medium within the circulation path 70; a pump driving motor 75 for driving the circulating pump 71; and an incoming hot water pipe 74 and a return hot water pipe 73 connected to the hot water heat exchanger 72.

The operation of the turbine generation system will be described with reference to the schematic block diagram in FIG. 4. In a start mode of the turbine generator 10, the inverter control circuit 42 transmits the K1 control signal 50, K2 control signal 51, K3 control signal 52, K4 control signal 53 respectively to the first through fourth switching means 34a, 30, 26, 27 associated therewith to close the first switching means 34a (toward the turbine generator 10), to close the second switching means 30, to close the third switching means 26, and to open the fourth switching means 27.

The inverter control circuit 42 also disables the driver 44 to inactivate the generation inverter 16. On the other hand, the inverter control circuit 42 enables the driver 40 to activate the starting inverter 32.

In the turbine generation system, the AC commercial power supply 46 is connected to the input of the rectifier 12 through the second and third switching means for rectification to DC power. The rectified DC power is fed to the DC booster 14 through the DC buses 22, 24 and boosted to a predetermined high voltage. The boosted DC power is converted to AC power by the starting inverter 32 and supplied to the turbine generator 10.

The inverter control circuit 42 can control the starting inverter 32, while adjusting the frequency and voltage through the driver 40, to drive the turbine generator 10 from a stop state to the purge speed, and accelerate the turbine generator 10 up to a predetermined starting speed. This embodiment is advantageous in that the rectifier 12 can be shared both for starting and for generation.

Next, the operation of the turbine generation system switches to a generation mode. After the gas turbine device 62 is supplied with adjusted air and fuel to accelerate turbine generator 10 to an autonomous speed at which it can autonomously operate, the inverter control circuit 42 transmits the switching K1 control signal 50 to render the first switching means opened (OFF). With this switching control, the output of the starting inverter 32 can be disconnected from the turbine generator 10.

The inverter control circuit 42 also transmits the inactive K3 control signal 52 to render the third switching means 26 opened (OFF) resulting in that the commercial power supply 46 is disconnected from the input of the rectifier 12.

The inverter control circuit 42 further transmits the inactive K2 control signal 51 to render the second switching means 30 opened (OFF) for disconnecting the starting rectifier 28 from the commercial power supply 46, and enables the driver 44 to activate the pulse-width-modulation generation inverter 16.

Subsequently, the inverter control circuit 42 detects the voltage, frequency and phase of the AC power output from the generation inverter 16 and determines whether they matches the commercial power supply 46 in voltage, frequency and phase. At the time the AC power supply matches the commercial power supply 46, the inverter control circuit 42 transmits the active K2 control signal 51 to render the second switching means 30 closed (ON), so that the output of the pulse-width-modulation generation inverter 16 can be linked to the lines of the commercial power supply 46.

Like the aforementioned embodiment, since a load 48 connected to the commercial power supply 46 is supplied with the AC power from the generation inverter 16, the amount of applied commercial power supply 46 can be reduced. In addition, the first switching means 34a can be switched to connect the output of the starting inverter 32, which has started the turbine generator 10, to the pump driving motor 75 to drive the recirculating pump 71 of the boiler 76 by the starting inverter.

In this event, the first switching means 34a may be provided with a three-state (connected to the turbine generator 10, nothing (opened) and the motor 75) switching function, or with a two-state (connected to the turbine generator 10 and the motor 75) switching function. In essence, any means can be used for connecting the output of the starting inverter 32 to any of the turbine generator 10 and pump driving motor 75.

The foregoing embodiment has been described in connection with a method of starting the turbine generator 10 using the commercial power supply 46. While the internal power supply 18 alone may be enough to start the turbine generator 10, a shortage of power capacity possibly due to a deterioration of the internal power supply 18 over time could cause difficulties in starting the turbine generator 10, so that the commercial power supply 46 is more advantageously utilized for improving the reliability of the turbine generation system.

Particularly, a multi-turbine generation system can be constituted by connecting a plurality of turbine generation systems to the commercial power supply 46 in parallel, in which one of the turbine generation system can be started while another turbine generation system has been linked to the commercial power supply 46.

Figure 5:
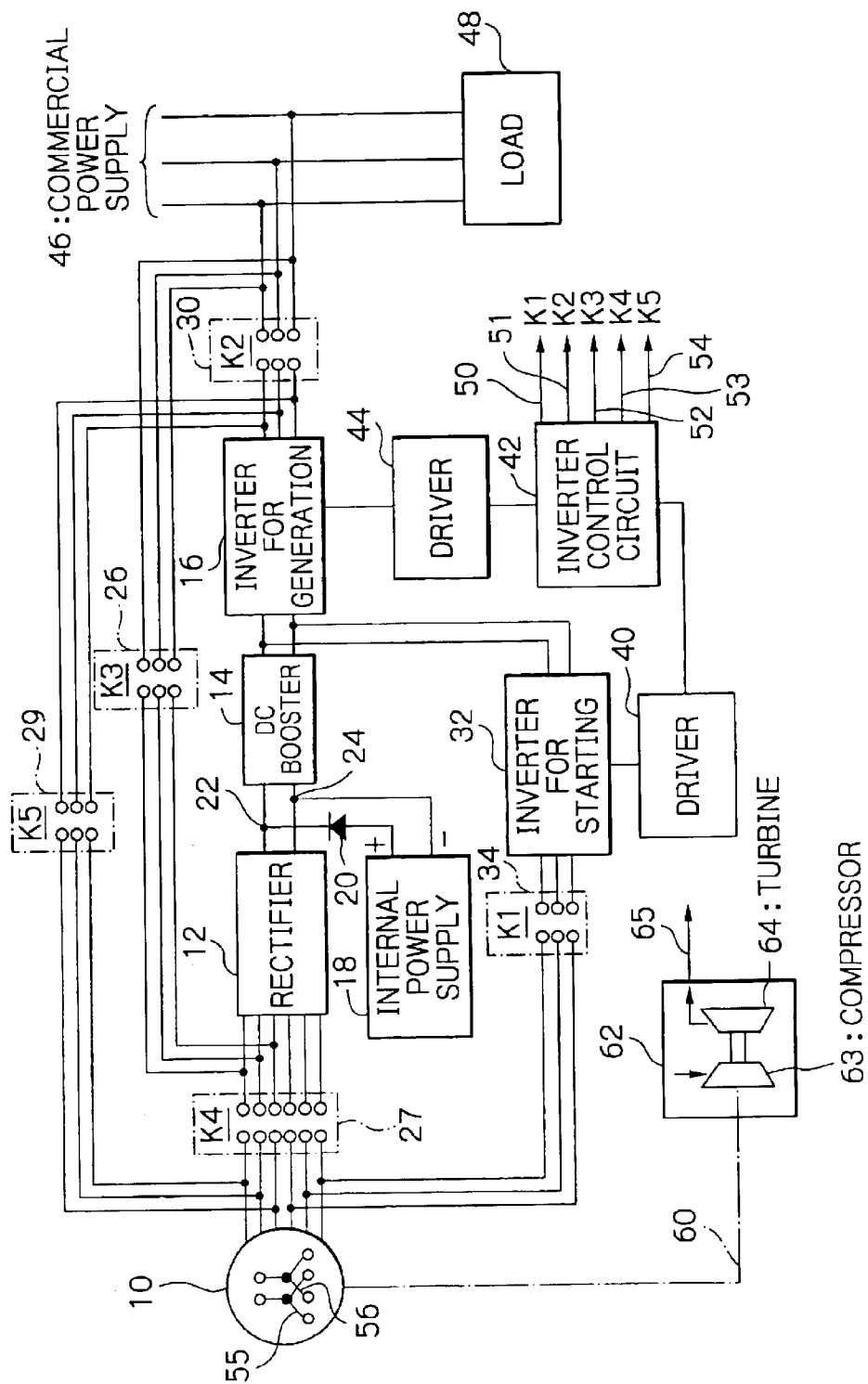
FIG. 5 is a schematic block diagram of a turbine generation system illustrating a fourth embodiment according to the present invention.

FIG. 5 is a schematic block diagram of a turbine generation system illustrating a fourth embodiment of the present invention. Like the aforementioned embodiment, the turbine generation system comprises a turbine generator 10; a rectifier 12; a DC booster 14; a generation inverter 16; DC buses 22, 24; an internal power supply 18; a pulse-width-modulated starting inverter 32; a driver 40; a driver 44; and an inverter control circuit 42, and repeated description on the same members is omitted.

The inverter control circuit 42 is connected to a first switching means (K1) 34 for activating or deactivating the starting and generation inverters through the driver 40 and driver 44 and for connecting/disconnecting the starting inverter 32 to/from a first stator winding 55 of the turbine generator 10; a second switching means (K2) 30 for connecting/disconnecting a commercial power supply 46 to/from the generation inverter 16; a third switching means (K3) 26 for connecting/disconnecting the commercial power supply 46 to/from the input of the rectifier 12; a fourth switching means (K4) 27 for connecting/disconnecting the turbine generator 10 to/from the rectifier 12; and a fifth switching means (K5) 29 for connecting/disconnecting the output of the generation inverter 16 to/from a second stator winding 56 of the turbine generator 10, respectively. The inverter control circuit 42 transmits K1–K5 control signals for controlling the respective switching means to open and close.

The turbine generator 10 comprises the first stator windings 55 and second stator windings 56 in Y-connection which are wound around a permanent magnet secured to a rotor. As mentioned above, a compressor 63 and a turbine 64 are commonly connected to a turbine rotor which has a shaft common to the rotor, thereby constructing a gas turbine device 62.

During a generation operation, the first stator windings 55 output three-phase AC power of U-phase, V-phase, W-phase to the rectifier 12 through the fourth switching means 27. During a starting operation, three-phase AC power of U-phase, V-phase, W-phase is supplied from the starting inverter 32 through the first switching means 34 to the windings.

During a generation operation, the second stator windings 56 output three-phase AC power of U-phase, V-phase, W-phase to the rectifier 12 through the fourth switching means 27. During a starting operation, the second stator windings 56 are supplied with three-phase AC power of U-phase, V-phase, W-phase from the generation inverter 16 through the fifth switching means 29.

The operation of the turbine generation system will be described with reference to the schematic block diagram in FIG. 5. In a starting mode of the turbine generator 10, the inverter control circuit 42 transmits the K1 control signal 50, K2 control signal 51, K3 control signal 52, K4 control signal 53 and K5 control signal 54 respectively to the first to fifth switching means 34, 30, 26, 27, 29 associated therewith to close the first switching means 34, to open the second switching means 30, to close the third switching means 26, to open the fourth switching means 27, and close the fifth switching means 29.

The inverter control circuit 42 also enables both the driver 44 and driver 40 to activate the generation inverter 16 and starting inverter 32.

The turbine generation system connects the AC commercial power supply 46 to the input of the rectifier 12 through the third switching means for rectification into a DC power supply. The rectified DC power supply is fed to the DC booster 14 through the DC buses 22, 24, and boosted to a predetermined high voltage.

The starting inverter 32 converts the DC power output from the DC booster 14 to sinusoidal AC power which is in turn supplied to the first stator windings 55 of the turbine generator 10 through the first switching means 34.

The generation inverter 16 converts the DC power output from the DC booster 14 to sinusoidal AC power which is in turn supplied to the second stator windings 56 of the turbine generator 10 through the fifth switching means 56.

The inverter control circuit 42 controls the generation inverter 16 and starting inverter 32 while adjusting the frequency and voltage therefrom, through the driver 40 and driver 44. Under the control of the inverter control circuit 42 the inverters 16 and 32 supply independent AC power to the first stator windings 55 and second stator windings 56 to drive the turbine generator 10 from a stop state to the purge speed and further accelerate the same up to a predetermined starting speed. This embodiment is advantageous in that the rectifier 12 and DC booster 14 can be shared by the starting inverter 32 and generation inverter 16.

Next, the turbine generation system switches to a generation mode. After the gas turbine device 62 is supplied with adjusted air and fuel to accelerate turbine generator 10 to an autonomous speed at which it can autonomously operate, the inverter control circuit 42 transmits the inactive K1 control signal 50 for controlling the first switching means to open (OFF). With this opening control, the output of the starting inverter 32 can be disconnected from the first stator winding 55 of the turbine generator 10.

The inverter control circuit 42 also transmits the inactive K3 control signal 52 for controlling the third switching means 26 to open (OFF), rendering the commercial power supply 46 disconnected from the input of the rectifier 12.

Similarly, the inverter control circuit 42 transmits the inactive K5 control signal 54 for controlling the fifth switching means 29 to open (OFF) for disconnecting the output of the generation inverter 16 from the second stator winding 56 of the turbine generator 10.

Similarly, the inverter control circuit 42 transmits the inactive K2 control signal 51 for controlling the second switching means 30 to open (OFF) for disconnecting the output of the generation inverter 16 from the commercial power supply 46, and again generates a control signal to be transmitted to the driver 44.

The inverter control circuit 42 further transmits the active K4 control signal 53 for controlling the fourth switching means 27 to close (ON) for connecting the first stator winding 55 and second stator winding 56 to the rectifier 12. The rectifier 12 full-wave-rectifies the AC power output from the first and second stator windings, and outputs DC power to the DC buses 22, 24.

Subsequently, the inverter control circuit 42 detects the voltage, frequency and phase of the AC power output from the generation inverter 16, and determines whether the AC power supply matches the commercial power supply 46 in voltage, frequency and phase. The circuit 42 transmits the active K2 control signal 51 for controlling the second switching means 30 to close (ON) when the AC power supply matches the commercial power supply 46, so that the output of the pulse-width-modulation generation inverter 16 can be linked to the lines of the commercial power supply 46 to supply the AC power to the load 48 from the generation inverter 16.

The foregoing embodiment has also been described in connection with a method of starting the turbine generator 10 using the commercial power supply 46. While the internal power supply 18 alone may be enough to start the turbine generator 10, a shortage of power capacity possibly due to a deterioration of the internal power supply 18 over time could cause difficulties in starting the turbine generator 10, so that the commercial power supply 46 is more advantageously utilized for improving the reliability of the turbine generation system.

The turbine generation system comprises a network link release (shut-off) mechanism. Specifically, the turbine generator 10 is rotated at approximately 60,000 rpm, which is the rated rotational speed, when a mechanical input of the turbine 64 is in balance with electric outputs of the stator windings. If a network fails on the commercial power supply 46, for example, experiences a power failure (no power) or over-frequency or under-frequency, the turbine generation system shuts off the second switching means 30 in about one second to 0.5 seconds after anomalous power is detected, thereby releasing the network link.

Here, the released network link would result in a reduced electric output of the turbine generator 10, temporarily lost energy balance, acceleration of the turbine 64 to an excessive speed, leading to a possible deterioration in auxiliary devices and a hydraulic circulation system. In such an event, for preventing the turbine 64 from sudden acceleration, by exciting the first stator windings 55 under the control of the starting inverter 32 using an auxiliary signal such as instantaneous effective power ΔP or an angular speed deviation Δω of the turbine generator 10, the rotor of the turbine generator 10 can be braked (decelerated). For example, a magnetic field direction of the first stator windings 55 is shifted such that AC power is supplied from the starting inverter 32 for applying a reverse torque to the rotor of the turbine generator 10.

A variety of methods can be selected for braking the turbine generator 10. Exemplary methods used herein may be dynamic braking which involves opening the fourth switching means 27 (OFF) and connecting a resistor to the first stator winding 55 to consume electric energy; regenerative braking which involves rectifying the power generated by the first stator winding 55 to supply the rectified power to the DC buses 22, 24; and plugging which involves switching over the two terminals of the first stator winding 55 for changing the direction of the rotating magnetic field to apply a reverse torque to the rotor from the starting inverter 32.

In this embodiment, when the rotor is braked using the inverter control circuit 42 which receives the angular speed deviation Δω of the turbine generator 10 as an input, the angular speed deviation Δω can be directly fed back to brake (decelerate) a rotor torque component when a transfer function between a field voltage deviation ΔEFD and electric torque ΔT of the turbine generator 10 calculates as a simple gain.

Also, in the turbine generator 10, when the rotational speed of the turbine 64 depends on the gain or phase characteristic, a phase delay may be compensated between an excitation input to the first stator windings 55 and electric torque. A control signal compensated for the phase delay can be input from the inverter control circuit 42 to the starting inverter 32 through the driver 40 to input an AC voltage output from the starting inverter 32 to the first stator windings 55, thereby braking the rotor of the turbine generator 10 to brake (decelerate) the turbine 64.

Subsequently, the inverter control circuit 42 transmits the inactive K2 control signal 51 for controlling the second switching means 30 to open (OFF) for shutting off the generation inverter 16 from the commercial power supply 46 (OFF) to execute the grid-off. The turbine generator 10 stands by even after the grid-off is executed such that the network can be immediately linked again when the network is recovered from a failure after the turbine generator 10 has continuously been rotated for a predetermined time at a standby speed.

The method of starting a turbine generator and the starting apparatus described in the foregoing embodiments are not limited to the illustrated embodiments but can of course be modified in various manners without departing from the spirit of the present invention. For example, the pulse-width-modulation inverter can be implemented by a high voltage-resistant semiconductor device which uses IGBT gates, while the DC matching circuit may be implemented by a filter circuit for converting a pulsed current to a flat DC current. In addition, a DC/DC converter serving as the DC matching circuit can be implemented by a double voltage rectifier composed of an inductance, a capacity and a transistor.

Moreover, since the starting rectifier 28 can be implemented by a low-voltage and low-frequency circuit, the starting speed can be increased by virtue of a high conductance of a transistor. On the other hand, since the power generated by the turbine generator in power generation operation is handled by circuits resistant to high voltages and high frequencies, the reliability can be ensured as well.

As described above, according to the method of starting a turbine generator and the turbine generation system of the present invention, the DC booster implementing the DC matching circuit 14 can be shared for starting and generation of the turbine generator 10.

What is claimed is:

1. A method of starting a turbine generator using an internal power supply, comprising the steps of:

deactivating a pulse-width-modulation inverter for generation connected to the turbine generator;

supplying DC power to a pulse-width-modulation inverter for starting from the internal power supply through a DC matching circuit;

closing first switching means to connect the starting inverter to the turbine generator;

driving the turbine generator up to a purge speed and supplying power from the starting inverter to the turbine generator for acceleration up to a predetermined starting speed;

driving gates of the starting inverter in response to a pulse-width-modulated signal received from an inverter control circuit;

deactivating the starting inverter after the speed of the turbine generator reaches a predetermined starting speed, and opening the first switching means to isolate the starting inverter from the turbine generator; and activating the generation inverter.

2. A method of starting a turbine generator using an external commercial power supply, comprising the steps of:

deactivating a pulse-width-modulation inverter for generation connected to the turbine generator;

closing second switching means to connect the commercial power supply to a rectifier for starting, and closing third switching means to connect the rectified power from the commercial power supply to a DC bus;

supplying a pulse-width-modulation inverter for starting with the rectified power from the commercial power supply through a DC matching circuit;

closing first switching means to connect the starting inverter to the turbine generator;

driving the turbine generator up to a purge speed and supplying power from the starting inverter to the turbine generator for acceleration up to a predetermined starting speed;

driving gates of the starting inverter in response to a pulse-width-modulated signal received from an inverter control circuit;

deactivating the starting inverter after the speed of the turbine generator reaches a predetermined starting speed, opening the first switching means to isolate the starting inverter from the turbine generator, opening the third switching means to isolate the rectified power from the commercial power supply from the DC bus and opening the second switching means to disconnect the starting rectifier from the commercial power supply; and activating the generation inverter (ON state).

3. A turbine generation system in which a turbine generator is started by an internal power supply, comprising:
   a pulse-width-modulation inverter for starting supplied with DC power from the internal power supply through a DC matching circuit;
   first switching means for connecting the starting inverter to the turbine generator; and
   an inverter control circuit for controlling to deactivate an inverter for generation connected to the turbine generator, drive the turbine generator up to a purge speed, supply the turbine generator with power from the starting inverter for acceleration up to a predetermined starting speed, deactivate the starting inverter (OFF state) after the speed of the turbine generator reaches the predetermined starting speed, and open the first switching means to isolate the starting inverter from the turbine generator, and activate the generation inverter.

4. A turbine generation system in which a turbine generator is started by an external commercial power supply, comprising:
   second switching means for connecting the commercial power supply to a rectifier for starting;
   third switching means for connecting the rectified power from the commercial power supply to a DC bus;
   fourth switching means for supplying the rectified power from the commercial power supply to a pulse-width-modulation inverter for starting through a DC matching circuit;
   first switching means for connecting the starting inverter to the turbine generator; and
   an inverter control circuit for controlling to deactivate a pulse-width-modulation inverter for generation connected to the turbine generator, drive the turbine generator up to a purge speed, supply the turbine generator with power from the starting inverter for acceleration up to a predetermined starting speed, deactivate the starting inverter after the speed of the turbine generator reaches the predetermined starting speed, open the first switching means to isolate the starting inverter from the turbine generator, open the third switching means to isolate the rectified power from the commercial power supply from the DC bus, open the second switching means to disconnect the starting rectifier from the commercial power supply, and activate the generation inverter.

5. A turbine generation system for supplying AC power, having a turbine generator, a rectifier, a DC matching circuit and a pulse-width-modulation inverter for generation connected in series, comprising:
   a pulse-width-modulation inverter for starting connected to an output of the DC matching circuit;
   first switching means for connecting the starting inverter to the turbine generator;
   second switching means for connecting the generation inverter to a commercial power supply;
   third switching means for connecting the commercial power supply to an input of the rectifier through the second switching means; and
   an inverter control circuit for controlling to drive the turbine generator up to a purge speed while maintaining the generation inverter deactivated, supply the turbine generator with AC power from the starting inverter for acceleration up to a predetermined starting speed, open the first switching means to disconnect the output of the starting inverter from the turbine generator after the speed of the turbine generator reaches a predetermined starting speed, open the third switching means to disconnect the commercial power supply from the rectifier, and activate the generation inverter to link the turbine generation system to the commercial power supply.

6. A turbine generation systems according to anyone of claims 3–5 wherein the inverter control circuit further controls to switch the opened first switching means to connect the output of the starting inverter to a pump driven motor to drive a circulating pump of a boiler for recovering waste heat of the turbine generator therethrough.

7. A turbine generation system for supplying AC power, having a turbine generator, a rectifier, a DC matching circuit and a pulse-width-modulation inverter for generation connected in series, comprising:
   a pulse-width-modulation inverter for starting connected to an output of the DC matching circuit;
   first switching means disposed between the starting inverter and first stator windings of the turbine generator;
   second switching means disposed between the generation inverter and the commercial power supply;
   third switching means disposed between an input of the rectifier and the commercial power supply;
   fifth switching means disposed between an output of the generation inverter and second stator windings of the turbine generator;
   fourth switching means disposed between the rectifier and the first and second stator windings of the turbine generator; and
   an inverter control circuit for controlling to close the first switching means, the third switching means and the fifth switching means, activate the starting inverter and the generation inverter, drive the turbine generator up to a purge speed, supply the first and second stator windings of the turbine generator with AC power from the starting inverter and the generation inverter, respectively, for acceleration up to a predetermined starting speed, open the first switching means, the third switching means and the fifth switching means to disconnect the outputs of the starting inverter and the generation inverter from the first and second stator windings of the turbine generator, respectively after the speed of the turbine generator reaches a predetermined starting speed, and close the second switching means and the fourth switching means to link the turbine generation system to the commercial power supply.

8. A turbine generation system according to claim 7 wherein the inverter control circuit further controls to close the first switching means to supply the first stator windings with AC power for applying a reverse torque to a rotor at the time a linkage to the commercial power supply is released, and subsequently open the second switching means.

9. A turbine generation system according to claim 7 or 8 wherein the inverter control circuit further controls to switch the opened first switching means to connect the output of the starting inverter to a pump driven motor to drive a circulating pump of a boiler for recovering waste heat of the turbine generator therethrough.

* * * * *